Figure 1:
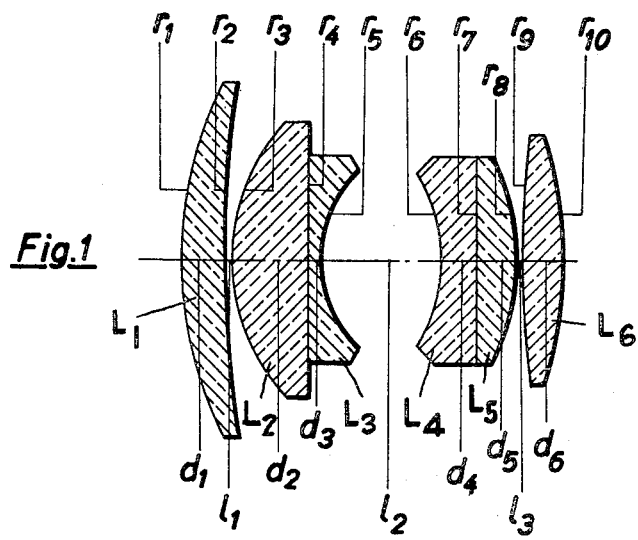

INVENTORS
THEODOR BRENDEL
and HANS LAUTENBACHER

By

THEIR ATTORNEYS

United States Patent Office 2,784,643
Patented Mar. 12, 1957

2,784,643
FOUR-MEMBERED GAUSS TYPE DOUBLE PHOTOGRAPHIC OBJECTIVE

Theodor Brendel and Hans Lautenbacher, Munich, Germany, assignors to Agfa Camera-Werk Aktiengesellschaft, Munich, Germany, a corporation of Germany Application November 9, 1953, Serial No. 391,018

Claims priority, application Germany November 18, 1952

10 Claims. (Cl. 88—57)

The present invention relates to an optical objective or lens system for photographic or other purposes of the kind corrected for spherical and chromatic aberration, coma, astigmatism, field curvature and distortion, and particularly to a type of photographic lens having a large ratio of lens aperture. More specifically, the invention relates to a lens system comprising four members separated by air spaces and composed of optical glasses in which the two outer members are simple convergent components and the two inner members are cemented meniscus components having concave surfaces directed towards the shutter.

With such type lens combinations which are usually considered derivatives of Gauss' double-objective, it is possible to obtain excellent corrective features with high-powered objectives. At the present time, such lens systems are commonly used with a focal length of 50 mm. in miniature cameras. However, such systems suffer from the disadvantage in that use of the same with a central shutter of size "OO" reduced the lens aperture radio to only 1:2.0 which is determined by the size of the shutter. Any increase in the ratio of the lens aperture would normally require utilization of a larger shutter (size "OO") and in turn would involve a longer shutter operating period than is obtainable with a size "OO." Moreover, a short shutter operating period increases in importance in direct proportion to the increase in the ratio of the lens aperture. Further, larger shutter sizes necessitate larger camera structures. As a consequence, up to the present time, no one has succeeded in obviating the aforenoted difficulties with a simplified lens system for miniature cameras employing central shutters of small size.

Accordingly, it is one object of the present invention to provide a lens system having the usual focal length of 50 mm. which can be used with a small size central shutter without destroying the effectiveness of the system in correcting for various errors. It is a further object of the present invention to provide such lens system in which the ratio of the lens aperture may be widened to 1:1.8. Other and distinct objects will become apparent from the description and claims which follow.

According to the present invention, the above objects may be attained, and the aforenoted deficiencies in conventional lens systems obviated, by employing a four membered objective in which the outer members are simple collective lenses and the two inner members are meniscuses, each comprising a collective and dispersing element for cooperation with the outer members. The four members are separated from each other by air spaces, including a central shutter space between the inner meniscuses, so as to present a front convergent element, a meniscus in front of and a meniscus behind the shutter and a rear convergent element in alignment.

With such arrangement, it has been discovered that the necessary reduction in the diameter of the marginal beams, which must be less than the entrance of the shutter, can be obtained by positioning the front collective lens as well as the collective part of the meniscus in front of the shutter in spaced relationship to each other and to the remaining parts of the system so that the value of the air space ($l_2$) between the two inner meniscuses plus the thickness ($d_3$) of the dispersive or negative part of the meniscus in front of the shutter is larger than 0.24 of the focal length of the entire system, while simultaneously the distance between the fourth refracting surface and the focus of that part of the system which consists of the two first positive lenses, is less than 0.75 times the focal length ($f'4$) of said part of the system. Maintenance of the above conditions restricts the marginal beams for a relative aperture of 1:1.8 at the fourth refracting surface to be of smaller diameter than the entrance of the shutter of a size OO.

Figure 2:
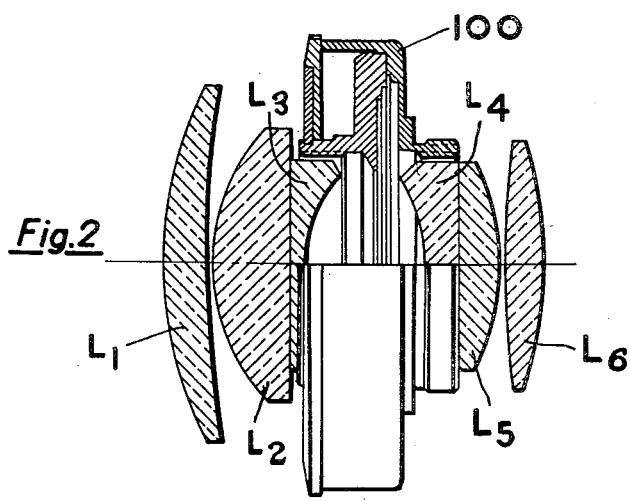

Having broadly disclosed the invention, reference will now be made to the accompanying drawings in describing specific examples of the same, and in which:

Fig. 1 is a diagrammatical sectional view of the lens system of the invention with appropriate legends, and Fig. 2 is a diagrammatical sectional view of the lens system on cooperation with a central shutter of the type utilized in minature cameras.

As shown in the drawings, the lens system comprises six components identified as $L_1$ through $L_6$, respectively, in which $L_1$ and $L_6$ constitute the front and rear convergent elements, respectively, while $L_2$, $L_3$ and $L_4$, $L_5$ comprise the inner opposed meniscus members, components $L_2$ and $L_5$ being convergent elements while components $L_3$ and $L_4$ are divergent elements of negative power. The conventional characteristics of the optical system are indicated by the usual legends in the figure in which $r$ signifies the respective refractive surfaces of the component, $d$ signifies the respective thicknesses of the components, and $l$ signifies the respective air spaces in the system. As shown more particularly in Fig. 2 of the drawings, the lens system is particularly suitable for use in cooperation with minature cameras employing central shutters, the shutter structure being graphically illustrated in the figure. A particularly advantageous feature of the invention is the relatively small outside diameter of components $L_3$ and $L_4$ which are maintained of such minor size as to be readily insertable into the conventional opening of the shutter structure "OO" and to be supported thereby. It will be appreciated that this eliminates the difficulties encountered with similar type systems necessarily employing larger lens diameters. The arrangement illustrated in Fig. 2 corresponds to a lens system having a focal length of 50 mm. and a shutter of size "OO." The proportion is 2:1.

One of the unexpected advantages comprising an essential novel feature of the present invention is that efficient correction can be retained by the instant lens system to a degree sufficient for the same purposes as those of the familiar objectives of similar construction employing much smaller ratios for the lens aperture, as for example, 1:2.0; and this, in spite of the necessary increase in ratio of the lens aperture and limited inherent corrective capacity governed by the shutter size employed in the instant system. This advantage is obtained in the present invention by maintaining the arithmetic mean of the index of refraction (as applied to the D-line of the spectrum, 587.6 mu) for all collecting lenses, i. e.

$$\frac{(n_1+n_2+n_5+n_6)}{4}$$

at a value which is larger than 1.65, and simultaneously retaining the sum of the absolute values of the radius of curvature of both concave surfaces ($r_5$, $r_6$) of the inner meniscuses at a value which is larger than 0.55 times the focal length of the entire system. It will be appreciated that proportioning the individual components in the system in the manner indicated will provide spherical and chromatic, as well as an excellent astigmatic, correction due to the obtaining of a small "Petzval" value.

In cases where it is desirable to reduce vignetting, it is recommended that the free diameter of the front lens ($L_1$) in addition to the effective aperture diameter be widened. Accordingly, it is generally preferred when utilizing the present invention to form the radius of the first refracting surface ($r_1$) to be larger than 0.70 and the thickness ($d_1$) of the front lens to be greater than 0.08 times the focal length of the entire system ($f$).

The previously described constructional characteristics can be generically expressed in the familiar formulas form as follows:

(a) $l_2 + d_3 > 0.24 \cdot f$
(b) $S_4' < 0.75 \cdot f_4'$ (wherein $S_4'$ means the distance between the fourth refracting surface and the focus of that part of the system and $f_4'$ is the focal length of that part of the system)

(c) $\dfrac{n_1 + n_2 + n_5 + n_6}{4} > 1.65$ (d) $r_5 + |r_6| > 0.55 \cdot f$
(e) $r_1 > 0.70 \cdot f$
(f) $d_1 > 0.08 \cdot f$
(g) $r_4 = \infty$
(h) $r_4 = r_7 = \infty$ The invention, however, will be more fully understood by reference to the following specific examples of lens systems employing the invention and in which $r$ denotes the radii of the glasses or lens, $d$ denotes the thicknesses, and $l$ denotes the distances between the lens surfaces. The examples are applied to systems employing focal lengths at 100 mm. and in which the ratio of the lens aperture is 1:1.8.

Example 1

[Relative opening 1:1.8. $f = 1.00000$.]

| Radius | Thickness or Air Separation | Refractive Index | Abbe No. |
|---|---|---|---|
| $r_1 = +0.75050$ | | | |
| | $d_1 = 0.09002$ | $n_d = 1.71785$ | $\nu = 47.9$ |
| $r_2 = +2.70684$ | | | |
| | $l_1 = 0.00100$ | | |
| $r_3 = +0.39269$ | | | |
| | $d_2 = 0.16507$ | $n_d = 1.66620$ | $\nu = 48.7$ |
| $r_4 = \infty$ | | | |
| | $d_3 = 0.01996$ | $n_d = 1.67197$ | $\nu = 32.3$ |
| $r_5 = +0.25649$ | | | |
| | $l_2 = 0.23992$ | | |
| $r_6 = -0.31870$ | | | |
| | $d_4 = 0.07026$ | $n_d = 1.67197$ | $\nu = 32.3$ |
| $r_7 = \infty$ | | | |
| | $d_5 = 0.08982$ | $n_d = 1.71785$ | $\nu = 47.9$ |
| $r_8 = -0.43515$ | | | |
| | $l_3 = 0.00100$ | | |
| $r_9 = +2.21163$ | | | |
| | $d_6 = 0.07984$ | $n_d = 1.66620$ | $\nu = 48.7$ |
| $r_{10} = -0.88794$ | | | |

Example 2

[Relative opening 1:1.8. $f = 1.00000$.]

| Radius | Thickness or Air Separation | Refractive Index | Abbe No. |
|---|---|---|---|
| $r_1 = +0.75375$ | | | |
| | $d_1 = 0.09045$ | $n_d = 1.71700$ | $\nu = 48.0$ |
| $r_2 = +3.19590$ | | | |
| | $l_1 = 0.00101$ | | |
| $r_3 = +0.40481$ | | | |
| | $d_2 = 0.16583$ | $n_d = 1.66755$ | $\nu = 41.9$ |
| $r_4 = \infty$ | | | |
| | $d_3 = 0.02010$ | $n_d = 1.71736$ | $\nu = 29.5$ |
| $r_5 = +0.27256$ | | | |
| | $l_2 = 0.24120$ | | |
| $r_6 = -0.32441$ | | | |
| | $d_4 = 0.07035$ | $n_d = 1.68893$ | $\nu = 31.1$ |
| $r_7 = \infty$ | | | |
| | $d_5 = 0.08543$ | $n_d = 1.69100$ | $\nu = 54.8$ |
| $r_8 = -0.42110$ | | | |
| | $l_3 = 0.00101$ | | |
| $r_9 = +2.06327$ | | | |
| | $d_6 = 0.07538$ | $n_d = 1.72342$ | $\nu = 38.0$ |
| $r_{10} = -0.97871$ | | | |

A particular advantage of the present invention resides in the simplification of the necessary production techniques in that the adjacent surfaces of the respective meniscus components ($L_2$, $L_3$ and $L_4$, $L_5$) are developed as plane surfaces ($r_4$, $r_7$) which can be readily cemented. It will be obvious that glueing of the respective meniscus components provides an exceedingly simple and efficient method for permanently connecting the members of one which is favored in the art, particularly with respect to the surface ($r_4$) of the meniscuses located in front of the shutter. If desired, however, it is possible to eliminate glueing of the respective meniscus components and either member ($L_3$ or $L_4$) can be separated from their adjacent components by a minor air space. In this case the curvatures of the adjacent surfaces contacting such slight air space may deviate from each other to a minor extent. Obviously, single parts of the respective meniscus components may also be separated with a slight difference in radii of curvature between adjacent faces.

It is known that prior improvements in optical systems have suggested similar lens arrangements, as for example, as set forth in U. S. Letters Patent 2,349,893, and 2,532,751, and in the copending application of Theodor Brendel, Serial No. 237,566, filed July 19, 1951, now Patent No. 2,745,315, dated May 15, 1956. Such advancements, however, have not provided the necessary advantages for miniature camera purposes without requiring extensive changes in camera size and constructional features.

As many apparently widely different embodiments of this invention may be made without departing from the spirit and scope hereof, it is to be understood that the above invention is not limited, except as defined in the appended claims.

What is claimed is:

1. An optical objective having a relative aperture higher than 1:2 and corrected for spherical and chromatic aberrations, coma, astigmatism, field curvature and distortion, and comprising a system having four members in spaced axial alignment of which the two outer members are simple convergent front and rear components and the two inner members are front and rear compound meniscus components each having a convergent element and a divergent element, said inner members being separated by an air space defining a central shutter area and characterized in that the sum of the space between said two inner members and the thickness of the negative part of the meniscus in front of the shutter is larger than 0.24 and less than 0.32 of the focal length of the entire system, and the distance between the fourth refracting surface and the focus of that part of the system which consists of the two first positive lenses, is less than 0.75 and larger than 0.60 times the focal length ($f_4'$) of said part of the system.

2. An optical objective as set forth in claim 1 in which the arithmetic mean of the index of refraction for the D-line of the spectrum for all converging lenses is larger than 1.65 and less than 1.73, and the sum of the absolute values of the radii of curvature of the two inner concave surfaces is greater than 0.55 and less than 0.62 times the focal length of the entire system.

3. A photographic lens system corrected for spherical and chromatic aberrations, coma, astigmatism, field curvature and distortion, and comprising a system having four members in spaced axial alignment of which the two outer members are simple convergent front and rear components and the two inner members are front and rear compound meniscus components each having a divergent element and a convergent element, said inner members being separated by an air space and a shutter mechanism positioned in said air space and supporting said inner members in spaced relationship, and characterized in that the sum of the space between said two inner members and the thickness of the front divergent meniscus component is larger than 0.24 and less than 0.32 of the focal length of the entire system, and the distance between the rear simple convergent component and the image of paraxial ray after passage through the refracting surface of said front converging element of said front meniscus is less than 0.75 and larger than 0.60 of the focal length behind said surface.

4. A photographic lens system as set forth in claim 3 in which the radius of the forward refracting surface of the front simple convergent component is greater than 0.70 and less than 0.85 times and the thickness of said component is greater than 0.08 and less than 0.12 times the focal length of the entire system.

5. A photographic lens system as set forth in claim 3 in which the convergent and divergent elements of said respective meniscuses are joined together in a plano surface by cement.

6. An optical objective as set forth in claim 1 and in which the convergent and divergent elements of said front meniscus include contacting plano surfaces.

7. An optical objective as set forth in claim 1 in which the components of said inner meniscuses are separated from each other by slight air spaces.

8. An optical objective as set forth in claim 7 in which the adjacent surfaces of the respective components of said two inner meniscuses have different radii of curvature.

9. A photographic lens system employing four spaced members comprising two outer convergent components and two inner meniscus elements each having convergent and divergent components having the following limitations:

[Relative opening 1:1.8. $f=1.00000$.]

| Radius | Thickness or Air Separation | Refractive Index | Abbe No. |
|---|---|---|---|
| $r_1=+0.75050$ | | | |
| | $d_1=0.09002$ | $n_d=1.71785$ | $\nu=47.9$ |
| $r_2=+2.70684$ | | | |
| | $l_1=0.00100$ | | |
| $r_3=+0.39269$ | | | |
| | $d_2=0.16507$ | $n_d=1.66620$ | $\nu=48.7$ |
| $r_4=\infty$ | | | |
| | $d_3=0.01996$ | $n_d=1.67197$ | $\nu=32.3$ |
| $r_5=+0.25649$ | | | |
| | $l_2=0.23992$ | | |
| $r_6=-0.31870$ | | | |
| | $d_4=0.07026$ | $n_d=1.67197$ | $\nu=32.3$ |
| $r_7=\infty$ | | | |
| | $d_5=0.08982$ | $n_d=1.71785$ | $\nu=47.9$ |
| $r_8=-0.43515$ | | | |
| | $l_3=0.00100$ | | |
| $r_9=+2.21163$ | | | |
| | $d_6=0.07984$ | $n_d=1.66620$ | $\nu=48.7$ |
| $r_{10}=-0.88794$ | | | |

(wherein $r$ denotes the radii of the glasses or lenses, $d$ denotes the thickness of the glasses or lenses and $l$ denotes the distance between the lens surfaces; i. e. the thickness of the lenses).

10. A photographic lens system employing four spaced members comprising two outer convergent components and two inner meniscus elements each having convergent and divergent components having the following limitations:

[Relative opening 1:1.8. $f=1.00000$.]

| Radius | Thickness or Air Separation | Refractive Index | Abbe No. |
|---|---|---|---|
| $r_1=+0.75375$ | | | |
| | $d_1=0.09045$ | $n_d=1.71700$ | $\nu=48.0$ |
| $r_2=+3.19500$ | | | |
| | $l_1=0.00101$ | | |
| $r_3=+0.40481$ | | | |
| | $d_2=0.16583$ | $n_d=1.66755$ | $\nu=41.9$ |
| $r_4=\infty$ | | | |
| | $d_3=0.02010$ | $n_d=1.71736$ | $\nu=29.5$ |
| $r_5=+0.27256$ | | | |
| | $l_2=0.24120$ | | |
| $r_6=-0.32441$ | | | |
| | $d_4=0.07035$ | $n_d=1.68893$ | $\nu=31.1$ |
| $r_7=\infty$ | | | |
| | $d_5=0.08543$ | $n_d=1.69100$ | $\nu=54.8$ |
| $r_8=-0.42110$ | | | |
| | $l_3=0.00101$ | | |
| $r_9=+2.06327$ | | | |
| | $d_6=0.07538$ | $n_d=1.72342$ | $\nu=38.0$ |
| $r_{10}=-0.97871$ | | | |

(wherein $r$ denotes the radii of the glasses or lenses, $d$ denotes the thickness of the glasses or lenses and $l$ denotes the distance between the lens surfaces; i. e. the thickness of the lenses).

References Cited in the file of this patent

UNITED STATES PATENTS

| | | |
|---|---|---|
| 2,117,252 | Lee | May 10, 1938 |
| 2,130,760 | Warmisham | Sept. 20, 1938 |
| 2,279,476 | Mihalyi | Apr. 14, 1942 |
| 2,349,893 | Warmisham et al. | May 30, 1944 |
| 2,532,751 | Baker | Dec. 5, 1950 |

FOREIGN PATENTS

| | | |
|---|---|---|
| 157,040 | Great Britain | Jan. 20, 1921 |
| 547,666 | Great Britain | Sept. 7, 1942 |